United States Patent [19]

Ando et al.

[11] 4,245,845
[45] Jan. 20, 1981

[54] VACUUM BOOSTER DEVICE

[75] Inventors: Hiromi Ando, Tokyo; Tomizo Azuma, Yamato, both of Japan

[73] Assignee: Tokico Ltd., Kawasaki, Japan

[21] Appl. No.: 860,322

[22] Filed: Dec. 14, 1977

Related U.S. Application Data

[63] Continuation-in-part of Ser. No. 752,663, Dec. 20, 1976, abandoned.

[30] Foreign Application Priority Data

Dec. 29, 1975 [JP] Japan ................................ 50-178794

[51] Int. Cl.² .............................................. F16J 15/12
[52] U.S. Cl. .................................. 277/189; 92/98 D
[58] Field of Search .................... 91/98 D, 99, 100; 277/187, 189, 188, 188 A

[56] References Cited

U.S. PATENT DOCUMENTS

| | | | |
|---|---|---|---|
| 2,102,673 | 12/1937 | Brown | 277/187 |
| 2,431,653 | 11/1947 | Volpin | 277/189 |
| 3,336,843 | 8/1967 | Griswold | 277/187 |

*Primary Examiner*—Robert I. Smith
*Attorney, Agent, or Firm*—Wenderoth, Lind & Ponack

[57] ABSTRACT

A vacuum booster device having a diaphragm the inner peripheral portion of which is rigidly clamped between the outer peripheral portion of a valve body and the central portion of a piston plate, wherein a rigid annular ring is attached to the diaphragm for preventing the radial outward movement of the material of the inner peripheral portion of the diaphragm when the diaphragm is compressed axially between the valve body and the piston plate.

2 Claims, 4 Drawing Figures

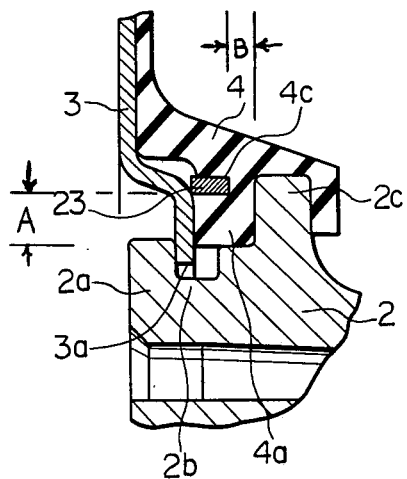
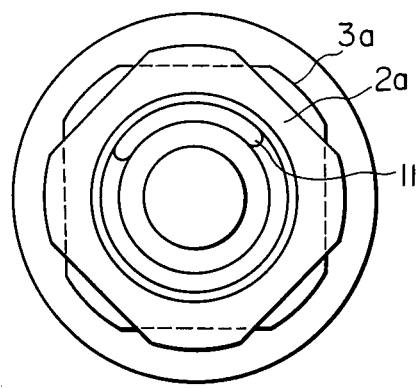
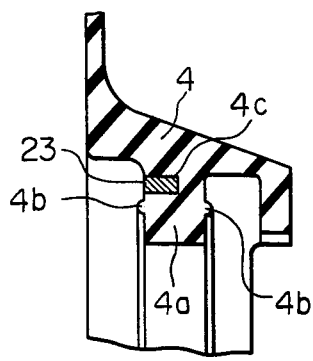

VACUUM BOOSTER DEVICE

This application is a continuation-in-part of Ser. No. 752,663 filed Dec. 20, 1976 and now abandoned.

This invention relates to improvements in a vacuum booster.

In one prior art vacuum booster comprising a diaphragm the inner peripheral portion of which is clamped between a side surface of the central portion of a piston and a side surface of a flange portion formed on the outer peripheral portion of a valve body so as to connect the piston, the diaphragm and the valve body integrally, the piston, the diaphragm and the valve body are assembled by first connecting the diaphragm to the valve body and then connecting the piston to the valve body by compressing the diaphragm axially and rotating the piston relative to the valve body to assemble them by the use of a so-called bayonet type connection. In such case, the fluid seal between a front chamber and a rear chamber which are separated by the diaphragm is attained by axial engagement of the inner peripheral portion of the diaphragm.

Since the inner peripheral portion of the diaphragm is compressed in the axial direction during the assembling operation the inner peripheral portion of the diaphragm tends to expand in the radially outward direction which decreases the interference of that portion so that a fluid seal between the front and rear chambers cannot be attained. Further, the diaphragm is pulled in the radially outward direction by the differential pressure acting on the diaphragm during operation of the booster, and the inner peripheral portion of the diaphragm is sometimes separated from the valve body.

An object of the present invention is to provide an improved vacuum booster wherein the aforementioned defects of the prior art vacuum booster are overcome.

According to the present invention an annular ring is disposed for preventing movement of the inner peripheral portion of the diaphragm in the radially outward direction.

The present invention will be described in detail with reference to the accompanying drawings, in which:

FIG. 2 is an enlarged cross-sectional view of part of the vacuum booster of FIG. 1;

FIG. 3 is an end view showing the valve body and the piston of FIG. 1 seen from the left side in FIG. 1;

FIG. 4 is an enlarged cross-sectional view of part of the diaphragm of the vacuum booster of FIG. 1.

Figure 1:
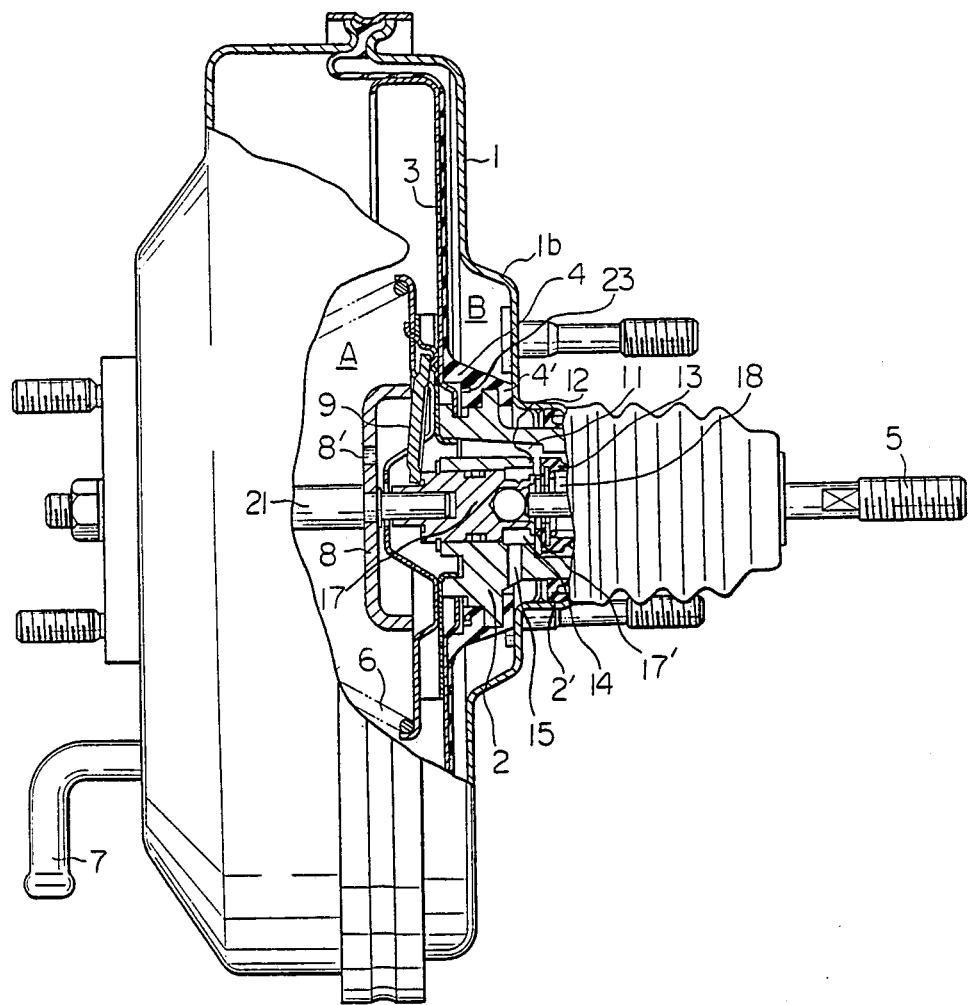
FIG. 1 is a partial cross-sectional view of a vacuum booster according to the present invention.

The vacuum booster shown in FIG. 1 comprises a housing 1, a valve body 2 slidably supported by a seal 2' secured to the housing 1, a piston plate 3, and a diaphragm 4 partitioning the interior of the housing 1 into front and rear chambers A and B and being adapted to cooperate with the piston plate 3 to receive differential pressure acting between the chambers A and B. A head portion 2a of a non-circular cross-section, such as a generally square cross-section as shown in FIG. 3, is formed on the inner end of the valve body 2, and a bore 3a of a cross-section corresponding to that of the head portion 2a is formed in the central portion of the piston plate 3. Thus, the head portion 2a of the valve body 2 may be fitted into the bore 3a of the piston plate 3 in a specified positional relationship. The configuration of the head portion 2a of the valve body 2 and the bore 3a of the piston plate 3 may be defined by a non-circular configuration within an inscribed circle of a suitable dimension such as a square, a hexagon, an octagon, or a circle with a cut-out or projecting portion on a portion of its periphery so as to be fitted with one another at a specified positional relationship.

A neck portion 2b is formed adjacent to the head portion 2a of the valve body 2 for allowing rotation of the piston plate 3 thereon when the head portion 2a has been passed through the bore 3a of the piston plate 3. The cross-sectional configuration of the neck portion 2b may be determined as desired as long as it allows rotation of the piston plate 3 fitted thereon, but it is preferable to provide the configuration in the shape of an inscribed circle within the cross-sectional configuration of the head portion 2a to obtain the maximum strength. An annular flange 2c is formed adjacent to the neck portion 2b of the valve body 2 for clamping the inner peripheral portion 4a of the diaphragm 4 between the flange 2c and the piston plate 3. Annular projections 4b may be formed on the inner peripheral portion 4a of the diaphragm 4, as shown in FIG. 4, which project in the axial directions when an axial force is not applied on the diaphragm 4.

An annular groove 4c having a diameter larger than that of the annular projections 4b is formed in the inner peripheral portion 4a of the diaphragm 4, extending into the inner peripheral portion from axial end the surface which is engaged by the piston plate 3, as shown in FIGS. 2 and 4 for receiving a ring 23 of rigid material therein.

The difference B between the axial dimension of ring 23 and the axial dimension of the inner peripheral portion 4a of the diaphragm is less than the radial distance A from the inner periphery of the inner peripheral portion 4a to the position of the ring 23.

In assembling the vacuum booster having the construction as described heretofore, the inner peripheral portion 4a of the diaphragm 4 is first located on the outer peripheral portion of the valve body 2, and the ring 23 is fitted in the annular groove 4c of the diaphragm 4. Then the piston plate 3 is fitted on the head portion 2a of the valve body 2 with the bore 3a of the piston plate 3 being aligned with the head portion 2a of the valve body 2 in their relative positional relationship, the piston plate 3 is displaced in the direction of the axis of the valve body 2 by applying a force on the piston plate 3 so as to compress the diaphragm 4 against the resiliency of the inner peripheral portion of the diaphragm 4. The projecting portions 4b of the diaphragm 4 increase the mass of the inner peripheral portion clamped between the valve body 2 and piston plate 3 and hence the force resisting compression is increased, making the engagement between the inner peripheral portion 4a and the piston plate 3 better. Then the valve plate 3 is rotated through a small angle (in the embodiment shown in FIG. 3 a suitable angle smaller than 90°, preferably, 45°) relative to the valve body 2, whereby the inner peripheral portion of the bore 3a of the piston plate 3 engages with the rear surface of the head portion 2a of the valve body 2 and the piston plate 3, the diaphragm 4 and the valve body 2 are connected rigidly together by the resiliency of the diaphragm 4. In the embodiment shown, the resiliency is afforded mainly by the annular projections 4b of the diaphragm 4, but it will be noted that an annular projection may be formed on the piston plate 3 or on the annular flange 2c of the valve body 2 which projects axially towards the inner peripheral portion of the diaphragm 4 for attaining a similar effect. It has been found that the material of the inner peripheral portion 4a of the diaphragm 4 confined radially inward of the ring 23 will tend to flow radially outward through the space B between the flange 2c and the ring 23 under a compressive stress in the inner peripheral portion of the diaphragm and a tension stress acting on the radially outer (with respect to ring 23) portion of the diaphragm during usage of the vacuum booster, and that such tendency can effectively be prevented by making the dimension B less than the dimension A. Thus, the ring 23 positioned according to the present invention effectively prevents the displacement of the material of the inner peripheral portion of the diaphragm 4 in the radially outward direction, and thereby the axial engagement between the flange 2c, the diaphragm 4 and the piston plate 3 can be maintained.

The operation of the vacuum booster shown in the drawing will be explained briefly. When an input shaft 5 connected to a brake pedal or the like (not shown) is not actuated, the valve body 2, the piston plate 3 and the diaphragm 4 are urged rightward in the drawing by a spring 6 so that a stop portion 4' of the diaphragm 4 engages with a housing portion 1b. The chamber A connected permanently to a source of vacuum pressure such as an engine intake manifold or the like (not shown) through a pipe 7 communicates with the chamber B, which is partitioned from the chamber A by the diaphragm 4, through a bore 8' of a fulcrum plate 8, a clearance formed between reaction levers 9 (not shown), a passage 11 formed in the valve body 2, the clearance between a valve seat 12 formed on the valve body 2 and a flexible seal member 13, a chamber 14 and a passage 15 formed in the valve body 2, so that the pressure in the chamber B is equal to that in the chamber A, and the vacuum booster maintains the condition shown in FIG. 1.

When the input shaft 5 is actuated against the force of a return spring (not shown) by the brake pedal or the like, a plunger 17 is moved leftward relative to the valve body 2 and the seal member 13 urged leftward by a spring moves in the same direction to engage with the valve seat 12 thereby closing the communication between the chambers A and B. When the input shaft 5 is moved further in the same direction, a valve seat 17' formed in the plunger 17 which moves leftward along with the input shaft 5 separates from the seal member 13, whereby the chamber B is connected to atmosphere through the passage 15, the chamber 14, a space 18 which is formed in the valve body 2 and has an opening (not shown) at the right end of the valve body 2 in the drawing. The pressure in the chamber B increases to cause a differential pressure across the diaphragm 4 so that the diaphragm 4, the piston plate 3 and the valve body 2 move leftward in FIG. 1. The piston plate 3 acts to generate an output force through the reaction levers 9 and the fulcrum plate 8 on an output shaft 21. The input shaft 5 receives the reaction force of the input shaft 21 through the reaction levers 9 and the plunger 17.

When the differential pressure acts on the diaphragm 4, the diaphragm 4 tends to stretch radially and circumferentially and the thickness thereof decreases, thus the inner peripheral portion 4a of the diaphragm 4 tends to escape from between the flange 2c of the valve body 2 and the piston plate 2. However, according to the present invention, the ring 23 effectively prevents the radial outward movement of the material of the inner peripheral portion 4a of the diaphragm 4.

When the input force applied on the input shaft 5 is decreased, the plunger 17 and the seal member 13 move rightward in the drawing from an equilibrium position wherein the seal member 13 contacts with the valve seals 17' and 12, forming a clearance between the valve seat 12 of the valve body and the seal member 13, thereby the pressure in the chamber B decreases and the vacuum booster device takes a new equilibrium position wherein the input force acting on the input shaft 5 is balanced with the reaction force from the reaction levers 9 and the return spring. When the input force being applied on the input shaft is released the booster device returns to the condition shown in FIG. 1.

It will be noted that the construction and the operation of the vacuum booster device as heretofore described is not limitative of the present invention, and that the present invention may be applied to vacuum boosters of various types.

In the thus described present invention, the radially outward movement of the material of the inner peripheral portion of the diaphragm is prevented by the annular ring and it is thus possible to maintain a predetermined engagement during the assembling of the valve body, the diaphragm and the piston plate together. Further, the diaphragm will not be released from the valve body when a differential pressure acts on the diaphragm when operating the vacuum booster device and reliable operation of the device can be attained.

What is claimed is:

1. In combination, a diaphragm for a vacuum booster having an annular inner peripheral portion, a valve body and a piston plate connected to each other with said annular inner peripheral portion of the diaphragm clamplped therebetween, said diaphragm being of resilient material, and a ring of rigid material disposed within said annular inner peripheral portion and being radially spaced from the inner periphery of the annular peripheral portion and extending axially into the diaphragm from one of the axial end surfaces of said portion a distance less than the dimension of the inner peripheral portion in the diaphragm in the axial direction of the diaphragm, the difference between the axial dimension of the inner peripheral portion of the diaphragm and the axial dimension of the ring being less than the radial distance of said ring from the inner periphery of said annular inner peripheral portion, whereby when the inner peripheral portion of the diaphragm is clamped between the piston plate and the valve body, flow of material of the inner peripheral portion of the diaphragm in the radially outward direction due to the compression of the inner peripheral portion of the diaphragm is substantially prevented.

2. A diaphragm as claimed in claim 1 in which said inner peripheral portion has an annular projection on the surface thereof from which said ring extends into said inner peripheral portion, said projection being radially inwardly of said ring, whereby when the inner peripheral portion of the diaphragm is clamped between the piston plate and the valve body the force resisting compression of the inner peripheral portion is increased.

* * * * *